(12) United States Patent
Li (10) Patent No.: US 6,967,838 B2
(45) Date of Patent: Nov. 22, 2005

(54) COMPUTER SYSTEM

(75) Inventor: Chao-Kang Li, Taipei Hsien (TW)

(73) Assignee: Aopen Inc., Hsi-Chih (TW)

( * ) Notice: Subject to any disclaimer, the term of this patent is extended or adjusted under 35 U.S.C. 154(b) by 199 days.

(21) Appl. No.: 10/605,457

(22) Filed: Sep. 30, 2003

(65) Prior Publication Data

US 2004/0257765 A1    Dec. 23, 2004

(30) Foreign Application Priority Data

Jun. 20, 2003  (TW) .............................. 92211351 U (51) Int. Cl.[7] .............................................. G06F 1/20
(52) U.S. Cl. ....................... 361/687; 361/688; 165/121
(58) Field of Search ................. 361/687–695; 165/121, 80.2

(56) References Cited

U.S. PATENT DOCUMENTS 6,775,136 B2 * 8/2004 Tozune et al. .............. 361/695
2004/0196629 A1 * 10/2004 Broder et al.

* cited by examiner

*Primary Examiner*—Yean-Hsi Chang
(74) *Attorney, Agent, or Firm*—Winston Hsu (57) ABSTRACT

A computer system has a central processing unit installed inside a housing for processing data and programs. The housing has a panel, which includes a plurality of first holes. The computer system further includes an upper duct and a lower duct installed on a region beside the central processing unit and mounted on the upper duct. The upper duct has a predetermined pattern, and a plurality of first hooks for engaging with the plurality of first holes of the housing. The lower duct has a positioning rib for engaging with the predetermined pattern of the upper duct.

22 Claims, 12 Drawing Sheets

Fig. 12 an air guide assembly of the computer
COMPUTER SYSTEM

BACKGROUND OF INVENTION

1. Field of the Invention

The present invention relates to a computer system, and more particularly, to an air guide assembly of the computer system.

2. Description of the Prior Art

In recent years, the dramatic development of computer technologies resulted in processors to run faster and faster. Occasionally, the heat generated by the fast-running processors caused computers to malfunction.

In general, components in a computer for ventilating the heat generated by the central processing unit (CPU) comprise a heat sink, an electric fan and an air guide assembly and so on. For example, the electric fan along with the air guide assembly is capable of ventilating heat generated by the CPU to a region outside of the computer and thus keep the CPU to work under an environment of approximately constant temperature.

Figure 1:
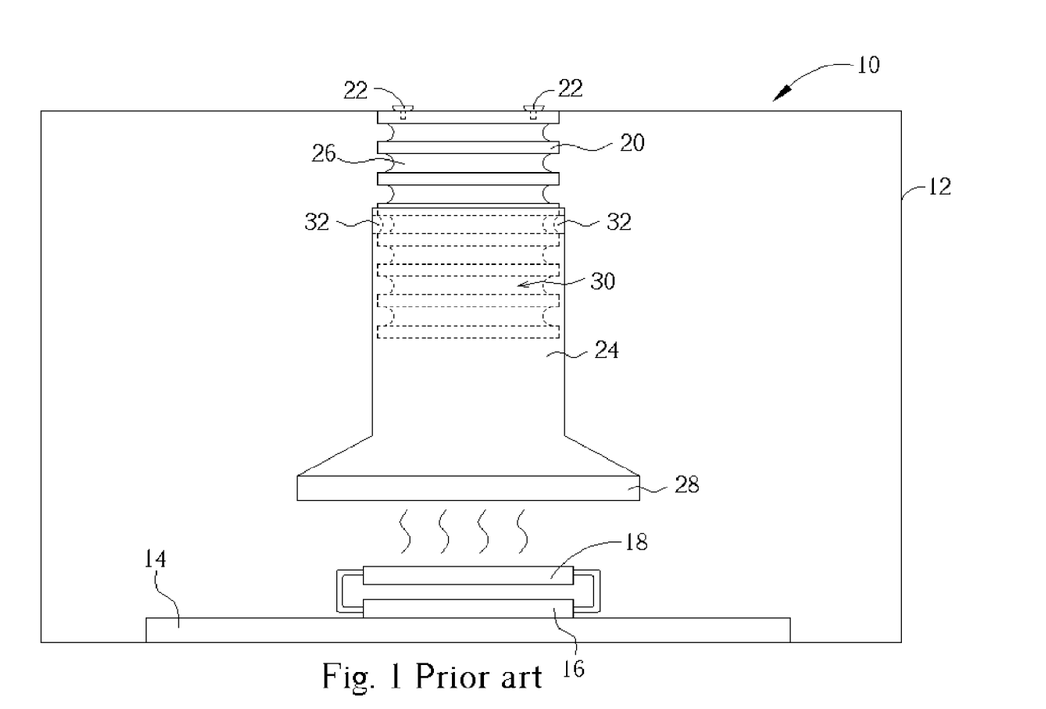
FIG. 1 is a schematic diagram of a computer system according to the prior art.

Please refer to FIG. 1, which is a prior art showing a perspective of schematic diagram of a computer system 10. The computer system 10 comprises a housing 12, a circuit board 14 installed inside the housing 12, a processor 16 installed on the circuit board 14, an electric fan 18 installed over the processor 16, a pipeline 20, a plurality of screws 22 for fixing the pipeline 20 to the housing 12, and a slide 24 mounted on the pipeline 20. Upon a surface of the pipeline 20 has been installed a plurality of parallel-disposed concave ring-shaped slots 26. A second end of the slide 24 has installed a convex ring 32 corresponding to each of the concave ring-shaped slots 26. Therefore, the slide 24 is capable of sliding up and down along the pipeline 20 and keeping a predetermined distance between a first end 28 of the slide 24 and the processor 16; also, to enhance the heat-ventilating efficiency of an air guide assembly consisting of the pipeline 20 and the slide 24.

According to the prior art as computer system 10, a method disclosed for fixing the pipeline 20 to the housing with the screws 22 is not only time-consuming but also cost-ineffective. Besides, the slide 24 is likely to be misplaced against the pipeline 20 while the computer system 10 is hit. This situation results in the fact that a distance between the first end 28 of the slide 24 and the processor 16 is not equal to the predetermined distance; furthermore, it results in the reduction of the heat-ventilating efficiency of the air guide assembly.

SUMMARY OF INVENTION

It is therefore a primary objective of the claimed invention to provide a computer system to overcome the drawbacks of foregoing prior arts.

According to the claimed invention, the computer system comprises a housing having a side plate installed with a plurality of first holes, a central processing unit installed inside the housing for processing data and program codes, a pipeline having a predetermined pattern and a plurality of first hooks to engage with the first holes and fixing the pipeline to the side plate, and a slide installed on a region beside the central processing unit and mounted onto the pipeline, the slide having at least a positioning protrude for engaging with the predetermined pattern of the pipeline.

The predetermined pattern comprises an engaging zone and a first protruding rib set. The first protruding rib set comprises a plurality of parallel-disposed first protruding ribs installed on a first side of the engaging zone, and a plurality of first spaces, each of which disposed between two adjacent first ribs of the first protruding rib set. The positioning protruding portion can be engaged into any one of the first spaces. Furthermore, the predetermined pattern comprises a guiding zone and a guiding track installed on the guiding zone, and the slide further comprises a guiding protrude, and a guiding slot installed on the guiding protrude for engaging with the guiding track while the slide is mounting onto the pipeline so that the slide is capable of sliding back and forth along the pipeline.

It is an advantage of the claimed invention that the pipeline and heat mask can be fixed to the housing by the engagement of hooks installed on the pipeline and heat mask and holes installed on the housing, therefore saving time to assemble and reduce cost. Moreover, the pipeline comprises a predetermined pattern comprising a first rib set of a plurality of first ribs, and a second rib set of a plurality of second ribs interlaced with the first ribs, enabling a distance between an end of the slide close to the processor and the processor almost equal to the optimal heat distance and promoting the heat-ventilating efficiency of the computer system. Lastly, when a positioning protrude installed on the slide is engaged with any first space of the first rib set or any second space of the second rib set of the pipeline, a guiding track and a fixing track (or a first fixing track and a second fixing track) along with a guiding slot installed on a guiding protrude of the slide are capable of fixing the slide to the pipeline tightly and of preventing the slide away from the pipeline when the computer is hit.

These and other objectives of the claimed invention will no doubt become obvious to those of ordinary skill in the art after reading the following detailed description of the preferred embodiment that is illustrated in the various figures and drawings.

DETAILED DESCRIPTION

Figure 2:
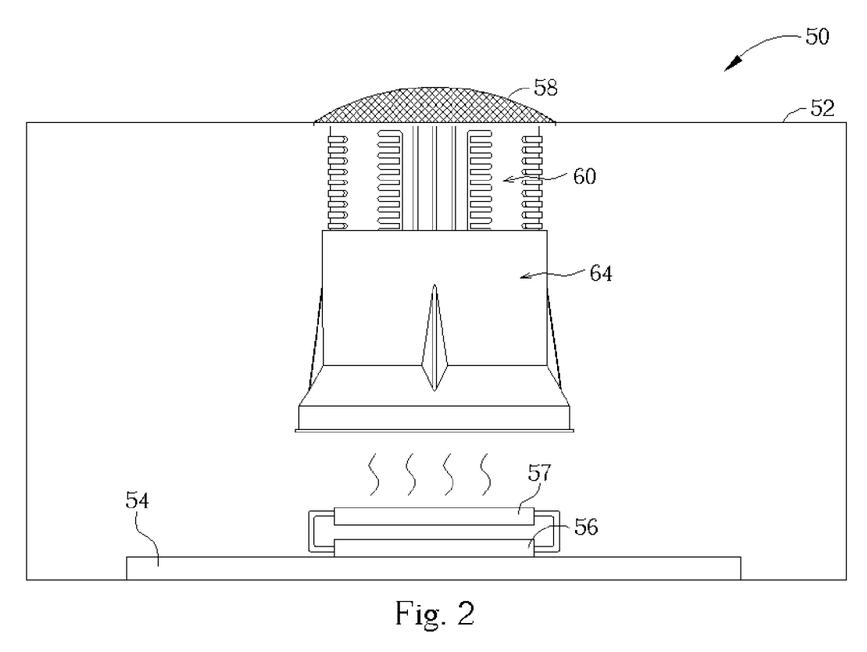
FIG. 2 is a schematic diagram of a computer system of the preferred embodiment according to the present invention.

Please refer to FIG. 2, which is a schematic diagram of a computer system 50 of the preferred embodiment according to the present invention. The computer system 50 comprises a housing 52, a circuit board 54 installed inside the housing 52, a processor 56 installed on the circuit board 54 for processing data and program codes, an electric fan 57 installed over the processor 56, a heat mask 58, a pipeline 60 fixed to the housing 52, and a slide 64 mounted on the pipeline 60. The pipeline 60 combines with the slide 64 to form an air guide assembly.

Figure 3:
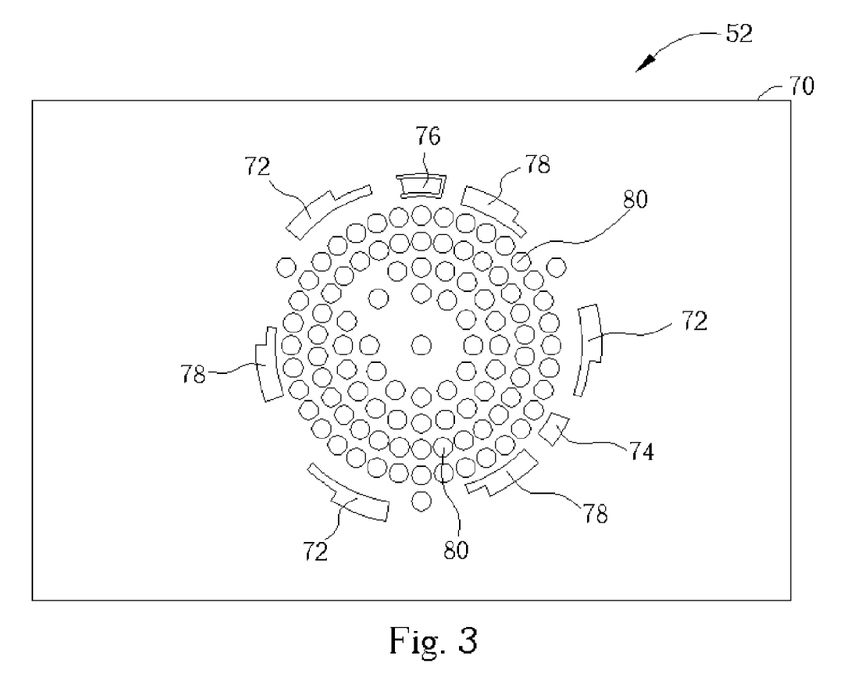
FIG. 3 is a top plan view of a housing of the computer system shown in FIG. 2 according to the present invention.

Please refer to FIG. 3, which is a top plan view of the housing 52 of the computer system 50 according to the present invention. The housing 52 comprises a side plate 70 comprising a plurality of first holes 72, at least a positioning hole 74, at least a positioning spring plate 76, a plurality of second holes 78, and at least a heat-ventilating hole 80 for ventilating heat generated by the processor 56. Each of the first holes 72 comprises a first large hole and a first small hole. Each of the second holes 72 comprises a second large hole and a second small hole as well.

Figure 4:
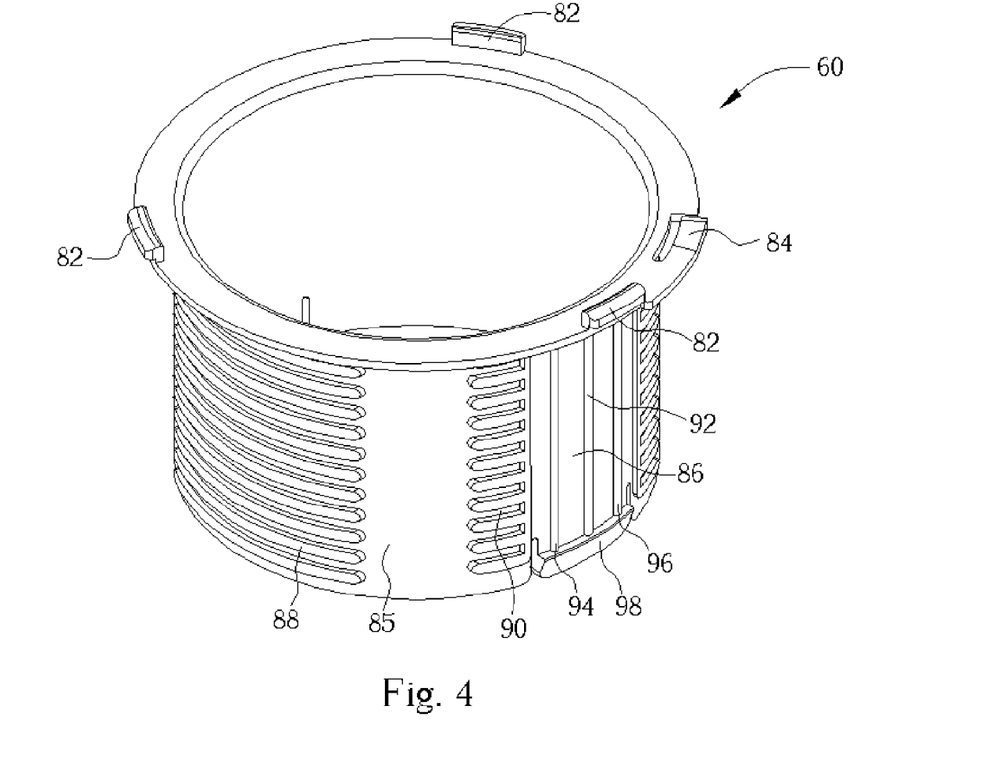
FIG. 4 is a schematic diagram of a pipeline of the computer system shown in FIG. 2 according to the present invention.

Please refer to FIG. 4, which is a schematic diagram of the pipeline 60 of the computer system 50 according to the present invention. The pipeline 60 has a side surface installed with a predetermined pattern and one end installed with at least a positioning spring plate 84 and a plurality of first hooks 82 for engaging with the first holes 72 and fixing the pipeline 60 to the side plate 70. The predetermined pattern comprises an engaging zone 85, at least a first rib set 88 installed on a first side of the engaging zone 85, at least a second rib set 90 installed on a second side of the engaging zone 85, a guiding zone 86, a guiding track 92, a first fixing track 94, a second fixing track 96, and a pipeline hook 98. The guiding track 92, the first fixing track 94 and the second fixing track 96 are all disposed on the guiding zone 86. The first rib set 88 comprises a plurality of parallel-disposed first ribs and a plurality of first spaces, each of which installed between two adjacent first ribs. The first spaces can be all equal in width or at least two ribs of the first ribs are not equal in width. The second rib set 90 comprises a plurality of parallel-disposed second ribs interlaced with the first ribs and a plurality of second spaces, each of which installed between two adjacent second ribs. The second spaces can be all equal in width or at least two ribs of the second ribs are not equal in width.

Figure 5:
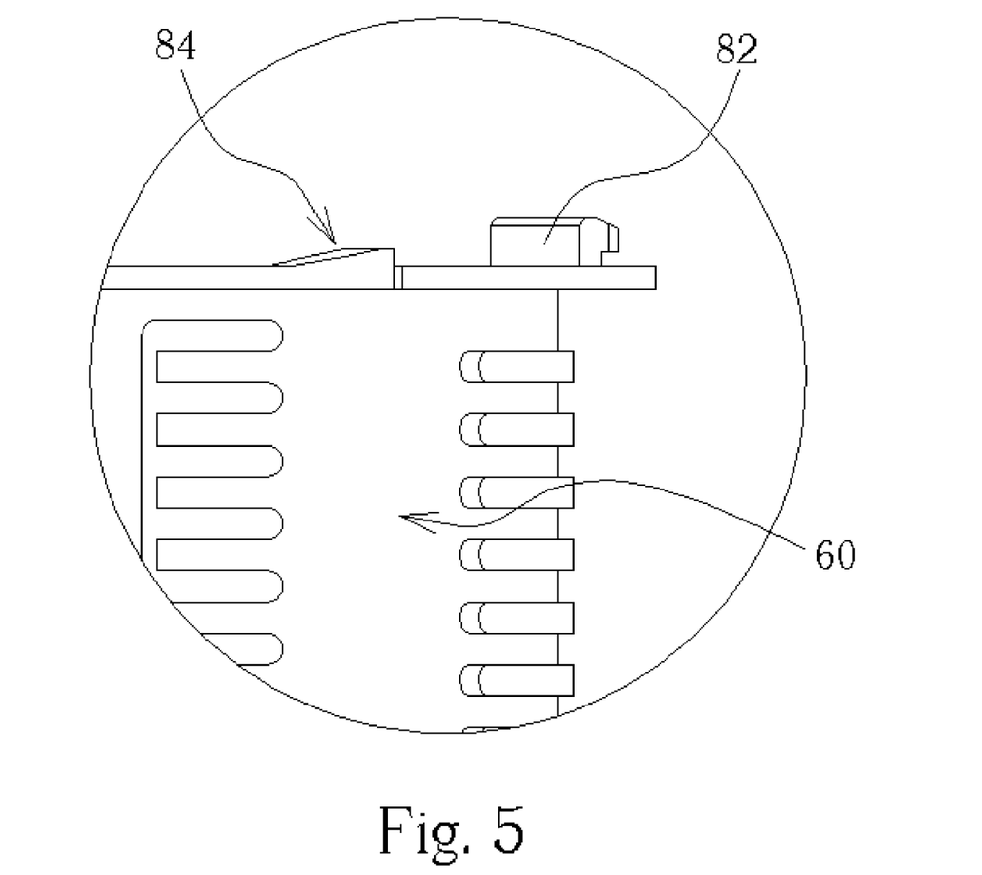
FIG. 5 is a front elevational view of a positioning spring plate of the pipeline shown in FIG. 4 according to the present invention.

Please refer to FIG. 5, which is a front elevational view of the positioning spring plate 84 of the pipeline 60 of the computer system 50 according to the present invention. The positioning spring plate 84 comprises a first end fixed to the pipeline 60 and a second end raised. When the first hook 82 of the pipeline 60 is engaged with the first large hole of the first hole 72 of the side plate 70, the side plate 70 suppresses the second end of the positioning spring plate 84 to a position as high as the first end of the positioning spring plate 84. When the first hook 82 of the pipeline 60 is screwed into the first small hole of the first hole 72 of the side plate 70, the second end of the positioning spring plate 84 is released and raised again and engages into the positioning hole 74, enabling the first hook 82 already screwed into the first small hole of the first hole 72 of the side plate 70 from departing from the first small hole of the first hole 72. Since those skilled in the art are familiar with the mechanism about the positioning spring plate 84 and positioning hole 74, so further description is hereby omitted.

Figure 6:
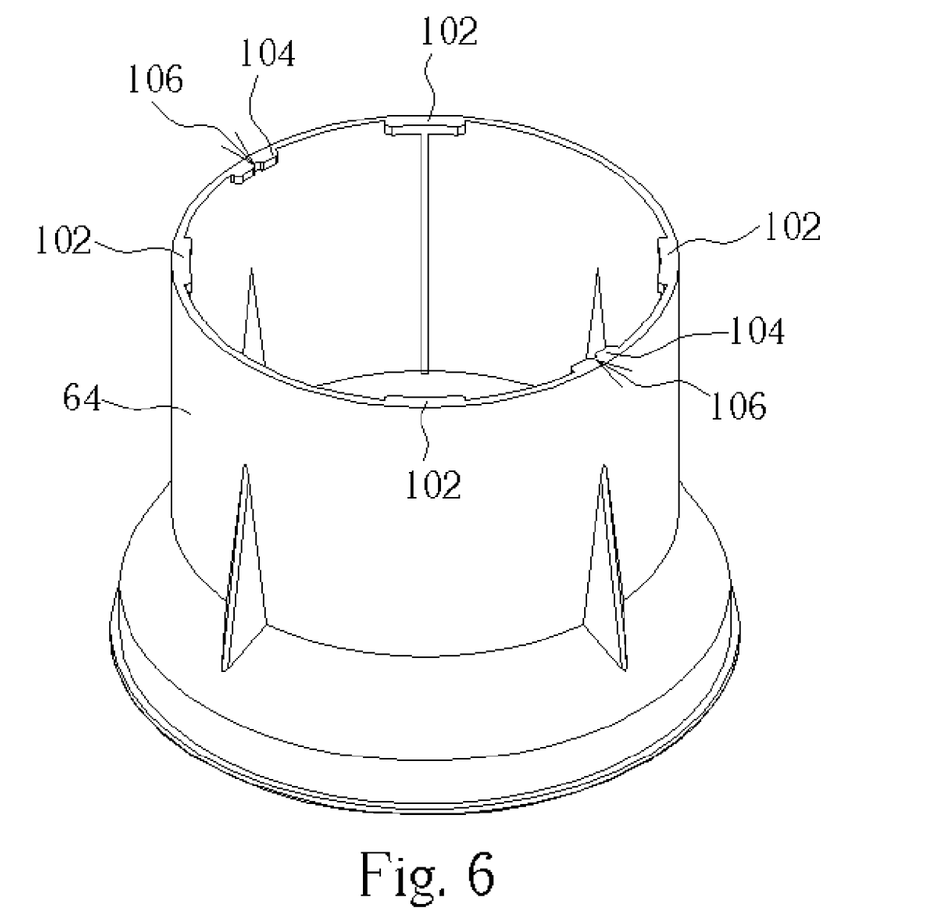
FIG. 6 is a schematic diagram of a slide of the computer system shown in FIG. 2 according to the present invention.

Please refer to FIG. 6, which is a schematic diagram of the slide 64 of the computer system 50 according to the present invention. The slide 64 comprises a first end installed with at least a positioning protrude 102 for engaging with the predetermined pattern (the first rib set 88 and the second rib set 90) of the pipeline 60, a guiding protrude 104, and a guiding slot 106 installed on the guiding protrude 106 for engaging with the guiding track 92 and enabling the slide 64 to slide back and forth along the pipeline 60 when the slide 64 is mounted on the pipeline 60 or for engaging with the first fixing track 94 or with the second fixing track 96 and fixing the slide 64 to the pipeline 60 when the positioning protrude 102 of the slide 64 is engaging with any one of first spaces or with any one of second spaces.

Figure 7:
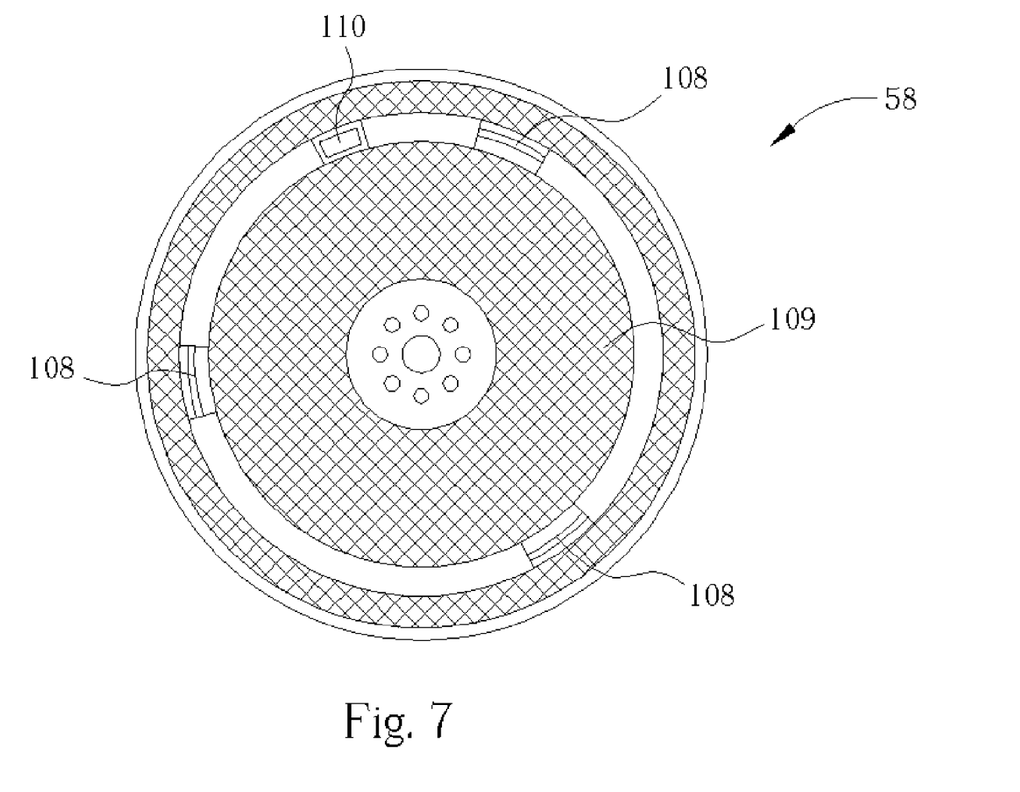
FIG. 7 is a bottom plan view of a heat mask of the computer system shown in FIG. 2 according to the present invention.

Please refer to FIG. 7, which is a bottom plat view of the heat mask 58 of the computer system 50 according to the present invention. The heat mask 58 comprises a plurality of second hooks 108 corresponding to the second holes 78 installed on the side plate 70 of the housing 52, a dust-proven net 109, and a positioning pillar 110 enabling the second hooks 108 of the heat mask 58 to engage easier with the second holes 78 installed on the side plate 70 by engaging with the positioning spring plate 76. Similar to the process that the first hook 82 of the pipeline 60 screws into the first large hole and the first small hole of the first hole 72 sequentially screws into the first small hole, the second hook 108 also screws into the second large hole and the second small hole of the second hole 78 sequentially screws into the second small hole as the positioning pillar 110 is engaging into the positioning spring plate 76 positioning the heat mask 58 to the side plate 70. In the preferred embodiment, the positioning pillar 110 is wedge-shaped and the positioning spring plate 76 installed on the housing 52 has a rectangle shape accordingly. Of course, the positioning pillar 110 can be of another type of shape, such as a cone, and the positioning spring plate 110 corresponding to the shape of the positioning pillar 110, would then have to have a shape of a circle to correspond to the cone.

Figure 8:
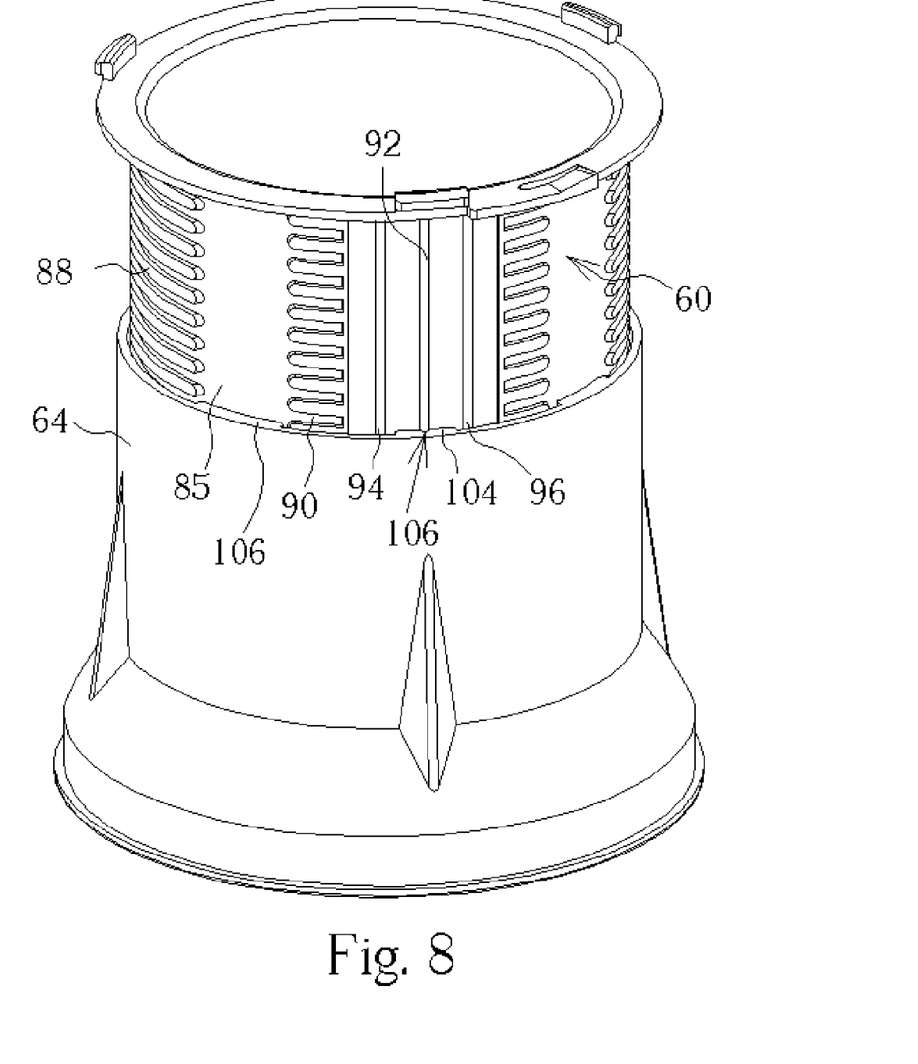
FIG. 8 is a state diagram showing the pipeline engaged with the slide of the computer shown in FIG. 2 according to the present invention.

Please refer to FIG. 8, which is a state diagram of the computer system 50 with the slide 64 mounted on the pipeline 60 according to the present invention. In FIG. 8, the guiding slot 106 installed on the guiding protrude 104 of the slide 64 is engaged with the guiding track 92. The slide 64 is capable of sliding up and down along the guiding track 92 and moving to a position that one end of the slide 64 close to the processor 56 has a distance from the processor 56 as close as an optimal heat distance. In other words, as the slide 64 moves back and forth along the guiding track 92 and stands on a position with one end of the slide 64 close to the processor 56 and has a distance from the processor 56 close to the optimal heat distance, the computer system 50 has an optimal heat-ventilating efficiency. At this moment, depending on whether the positioning protrude 102 is moved to a position corresponding to any first space of the first rib set 88 or to any second space of the second rib set 90, the positioning protrude 102 of the slide 64 can engage into the first space of the first rib set 88 or the second space of the second rib set 90. While the positioning protrude 102 is engaged with any first space of the first rib set 88, the guiding slot 106 of the guiding protrude 104 of the slide 64 is engaged into the first fixing track 94. On the contrary, the guiding slot 106 of the guiding protrude 104 of the slide 64 is engaged with the second fixing track 96 while the positioning protrude 102 is engaged with any second space of the second rib set 90. Since the first ribs of the first rib set 88 are interlaced with the second ribs of the second rib set 90, a distance between the end of the slide 64 close to the processor 56 and the processor 56 can be tuned almost simultaneously to the optimal heat distance. The computer system 50 therefore has the optimal heat-ventilating efficiency.

The pipeline hook 98 and guiding protrude 104 of the computer system 50 are made of materials of plasticity such as plastic.

Figure 9:
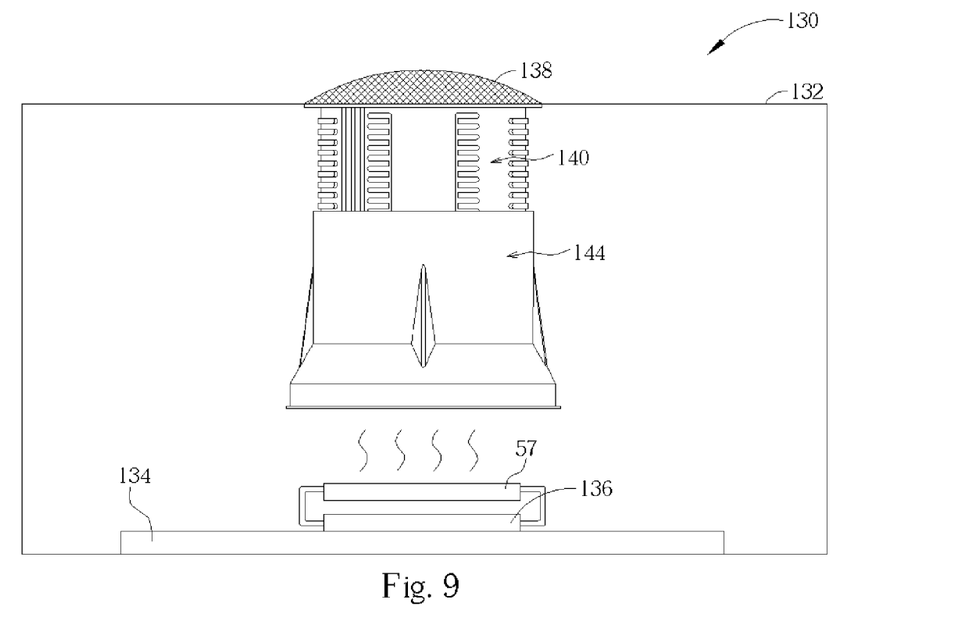
FIG. 9 is a schematic diagram of a computer system of a second embodiment according to the present invention.

In the above-described computer system 50, the slide 64 comprises the positioning protrude 102 and the guiding protrude 104, and the pipeline 60 comprises the guiding track 92, the first fixing track 94 and the second fixing track 96, all of which disposed in the guiding zone 86. Alternatively, the slide 64 can comprise the guiding protrude 104 only, while the pipeline 60 can comprises the guiding track 92, the first fixing track 94 and the second fixing track 96, all of which disposed in the engaging zone 85 correspondingly. Please refer to FIG. 9 and FIG. 10. FIG. 9 is a schematic diagram of a computer system 130 of a second embodiment according to the present invention. The computer system 130 comprises a housing 132, a circuit board 134 installed inside the housing 132, a processor 136 installed on the circuit board 134, the electrical fan 57 installed over the processor 136, a heat mask 138, and an air guide assembly 140 fixed to the housing 132. The housing 132 and the heat mask 134 have structures same as those of the housing 52 and the heat mask 58 of the computer system 50, so further description is hereby omitted.

Figure 10:
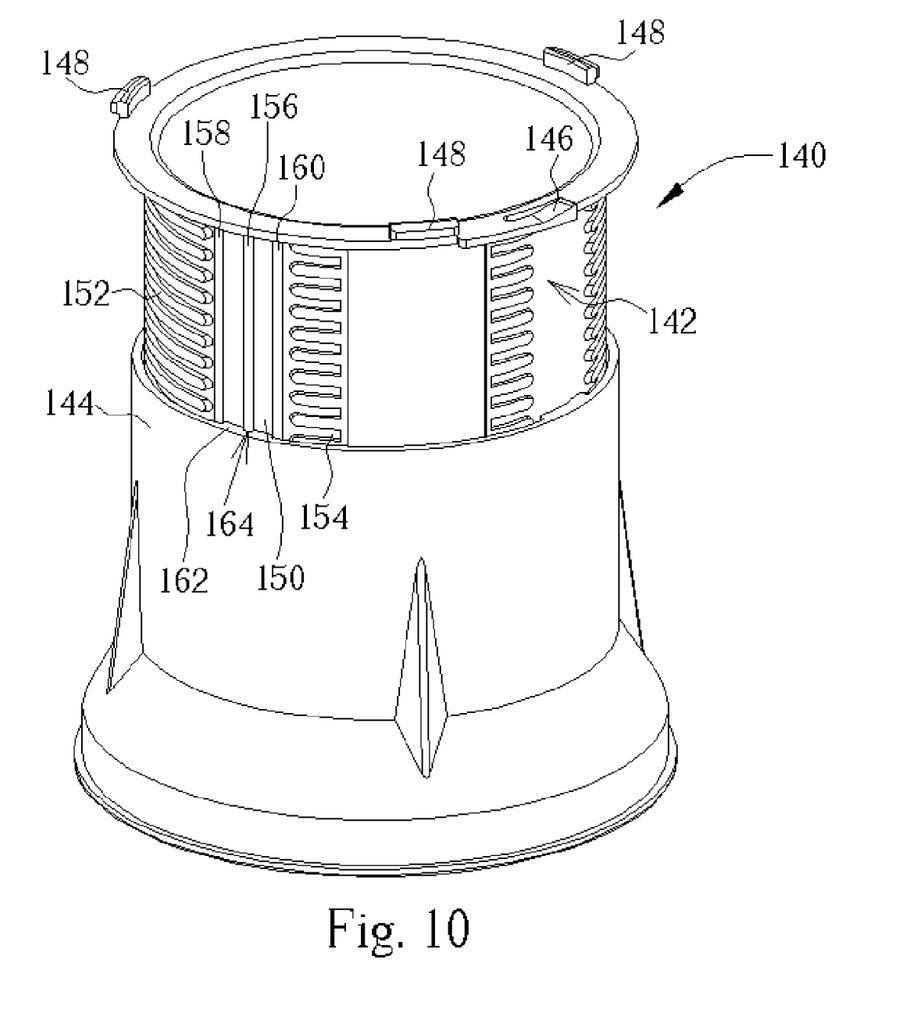
FIG. 10 is a schematic diagram of an air guide assembly of the computer system shown in FIG. 9 according to the present invention.

FIG. 10 is a schematic diagram of the air guide assembly 140 of the computer system 130 according to the present invention. The air guide assembly 140 comprises a pipeline 142 and a slide 144 mounted on the pipeline 142. Generally, the pipeline 142 and the slide 144 of the computer system 130 have structures similar to those of the pipeline 60 and the slide 64 of the computer system 50. In other words, the pipeline 142 has an end installed with a positioning spring plate 146 and a plurality of first hooks 148 for engaging with the housing 132. The pipeline 142 further has a side surface installed with a predetermined pattern comprising an engaging zone 150, at least a first rib set 152 installed on a first side of the engaging zone 150, at least a second rib set 154 installed on a second side of the engaging zone 150, a guiding track 156, a first fixing track 158, a second fixing track 160, and a slide hook (not shown), whose functions and location are same as those of the slide hook 98 of the slide 60 of the computer system 50. Please note that the predetermined pattern of the pipeline 142 does not have a guiding zone, and the guiding track 156, the first fixing track 158 and the second fixing track 160 are all disposed on the engaging zone 150. The first rib set 152 comprises a plurality of parallel-disposed first ribs and a plurality of first spaces, each of which is installed between two adjacent first ribs. The first spaces can be equal in width, if they are not at least two ribs of the first ribs are not equal in width. The second rib set 154 comprises a plurality of parallel-disposed second ribs interlaced with the first ribs and a plurality of second spaces, each of which installed between two adjacent second ribs. The second spaces can be all equal in width or at least two ribs of the second ribs are not equal in width.

The slide 144 of the air guide assembly 140 comprises a first end installed with at least a guiding protrude 162 for engaging with the predetermined pattern (the first rib set 152 and the second rib set 154) of the pipeline 142, and a guiding slot 164 installed on the guiding protrude 162 for engaging with the guiding track 156 when the slide 144 is mounted on the pipeline 142 so that the slide 144 is capable of sliding back and forth along the pipeline 142, or for engaging with either the first fixing track 158 or with the second fixing track 160 when the guiding protrude 162 of the slide 144 is engaged with any first space of the first rib set 152 or any second space of the second rib set 154, so as to fix the slide 144 to the pipeline 142. According to the above-mentioned, when the guiding protrude 162 is engaged with any first space of the first rib set 152 or with any second space of the second rib set 154, the guiding protrude 162 provides a function similar to that the positioning protrude 102 of the slide 64 of the computer system 50 provides, that is fixing the slide 144 to the pipeline 142.

The pipeline hook (similar to the pipeline hook 98 of the computer system 50) and guiding protrude 162 of the computer system 130 are made of materials of plasticity such as plastic.

Figure 11:
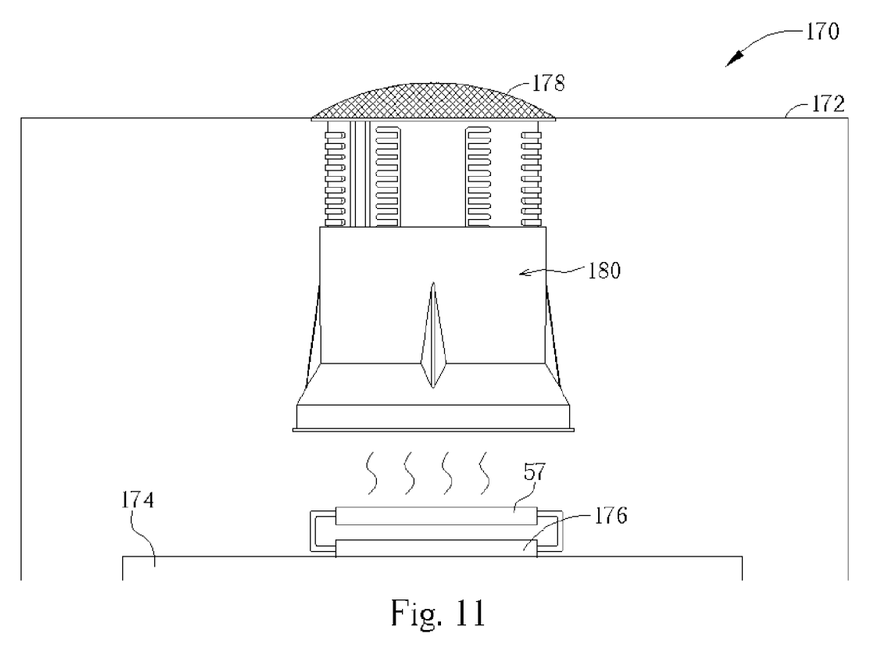
FIG. 11 is a schematic diagram of a computer system of a third embodiment according to the present invention.
Figure 12:
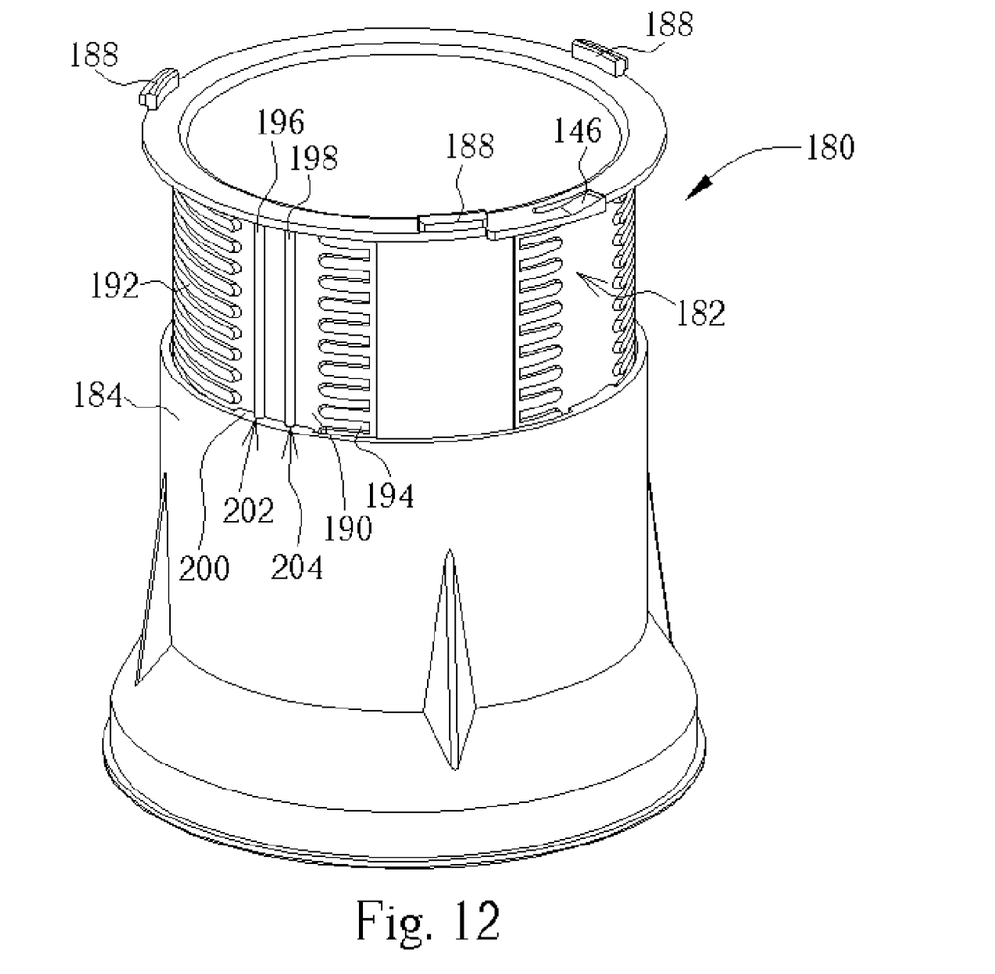
FIG. 12 is a schematic diagram of an air guide assembly of the computer system shown in FIG. 11 according to the present invention.

Please refer to FIG. 11 and FIG. 12. FIG. 11 is a schematic diagram of a computer system 170 of a third embodiment according to the present invention. The computer system 170 comprises a housing 172, a circuit board 174 installed inside the housing 172, a processor 176 installed on the circuit board 174, the electric fan 57 installed over the processor 176, a heat mask 178, an air guide assembly 180 fixed to the housing 172. The housing 172 and heat mask 178 have structures similar to those of the housing 52 and heat mask 58 of the computer system 50, so further description is hereby omitted.

FIG. 12 is a schematic diagram of the air guide assembly 180 of the computer system 170 according to the present invention. The air guide assembly 180 comprises a pipeline 182 and a slide 184 mounted on the pipeline 182. Generally, the pipeline 182 and the slide 184 of the computer system 170 have structures similar to those of the pipeline 60 and the slide 64 of the computer system 50. In other words, the pipeline 182 has an end installed with a positioning spring plate 146 and a plurality of first hooks 188 for engaging with the housing 172. The pipeline 182, a side surface installed with a predetermined pattern comprising an engaging zone 190, at least a first rib set 192 installed on a first side of the engaging zone 190, at least a second rib set 194 installed on a second side of the engaging zone 190, a guiding track 196, a first fixing track 198, and a slide hook (not shown), whose functions and location are similar to those of the slide hook 98 of the slide 60 of the computer system 50. Please note that the predetermined pattern of the pipeline 182 does not have a guiding zone or a second fixing track, and the guiding track 196 and the first fixing track 198 are both disposed on the engaging zone 190. The first rib set 192 comprises a plurality of parallel-disposed first ribs and a plurality of first spaces, each of which installed between two adjacent first ribs. The first spaces can be all equal in width or at least two ribs of the first ribs are not equal in width. The second rib set 194 comprises a plurality of parallel-disposed second ribs interlaced with the first ribs and a plurality of second spaces, each of which installed between two adjacent second ribs. The second spaces can be all equal in width otherwise at least two ribs of the second ribs are not equal in width.

The slide 184 of the air guide assembly 180 comprises a first end installed with at least a guiding protrude 200 for engaging with the predetermined pattern (the first rib set 192 and the second rib set 194) of the pipeline 182, a first guiding slot 202 and a second guiding slot 204, both of which installed on the guiding protrude 200 for respectively engaging with the guiding track 196 and with the first fixing track 198 when the slide 184 is mounted on the pipeline 182 so that the slide 184 is capable of sliding back and forth along the pipeline 182, for respectively engaging with nothing and with the guiding track 196 when the guiding protrude 200 of the slide 184 is engaged with any first space of the first rib set 192, or for respectively engaging with the first fixing track 198 and with nothing when the guiding protrude 200 of the slide 184 is engaged with any second space of the second rib set 194, so as to fix the slide 184 to the pipeline 182. According to the above-mentioned, when the guiding protrude 200 is engaged with any first space of the first rib set 192 or with any second space of the second rib set 194, the guiding protrude 200 provides a function similar to that the positioning protrude 102 of the slide 64 of the computer system 50 provides, that is fixing the slide 184 to the pipeline 182.

The pipeline hook and guiding protrude 200 of the computer system 170 are made of materials of plasticity such as plastic.

In contrast to the prior art, the present invention can provide a computer system comprising a housing, a processor, a heat mask, a pipeline and a slide. The pipeline and heat mask can be fixed to the housing by the engagement of hooks installed on the pipeline and a heat mask and holes installed on the housing, therefore saving time to assemble and a reduction in cost. Moreover, the pipeline comprises a predetermined pattern comprising a first rib set of a plurality of first ribs, and a second rib set of a plurality of second ribs interlaced with the first ribs, enabling a distance between an end of the slide close to the processor and the processor almost equal to the optimal heat distance, which in then promotes the heat-ventilating efficiency of the computer system. Lastly, when a positioning protrude installed on the slide is engaged with any first space of the first rib set or any second space of the second rib set of the pipeline, a guiding track and a fixing track (or a first fixing track and a second fixing track) along with a guiding slot installed on a guiding protrude of the slide are capable of fixing the slide to the pipeline tightly and of preventing the slide to move away from the pipeline when the computer is hit by a damaging force.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer system comprising:
   a housing having a side plate installed with a plurality of first holes;
   a central processing unit installed inside the housing for processing data and program codes;
   a pipeline having a predetermined pattern and a plurality of first hooks for engaging with the first holes and fixing the pipeline to the side plate; and
   a slide installed on a region beside the central processing unit and mounted onto the pipeline, the slide having at least a positioning protrude for engaging with the predetermined pattern of the pipeline so that the slide is capable of sliding up and down along the pipeline.

2. The computer system of claim 1 wherein the side plate of the housing further comprises at least a heat vent for ventilating heat generated by the central processing unit.

3. The computer system of claim 1 wherein the side plate of the housing further comprises at least a first positioning hole, and the pipeline further comprises a first positioning pillar corresponding to the first positioning hole.

4. The computer system of claim 1 wherein the side plate of the housing further comprises at least a positioning spring plate hole, and the pipeline further comprises at least a positioning spring plate corresponding to the positioning spring plate hole.

5. The computer system of claim 1 further comprising a heat mask having a plurality of second hooks, and the side plate of the housing further comprising a plurality of second holes for engaging with the second hooks accordingly.

6. The computer system of claim 5 wherein the side plate of the housing further comprises a plurality of second positioning spring plate holes, and the heat mask further comprises a plurality of second positioning spring plates corresponding to the second positioning spring plate holes.

7. The computer system of claim 1 wherein the predetermined pattern comprises:
   an engaging zone; and
   a first rib set comprising:
      a plurality of parallel-disposed first ribs installed on a first side of the engaging zone; and
      a plurality of first spaces, each of which disposed between two adjacent first ribs of the first rib set;
   and the positioning protrude can be engaged into any one of the first spaces.

8. The computer system of claim 7 wherein all of the first spaces are equal in length.

9. The computer system of claim 7 wherein at least two of the first spaces are not equal in length.

10. The computer system of claim 7 wherein the predetermined pattern further comprises:
    a second rib set comprising:
       a plurality of parallel-disposed second ribs installed on a second side of the engaging zone and interlaced with the first ribs; and
       a plurality of second spaces, each of which disposed between two adjacent second ribs of the second rib set;
    and the positioning protrude can be engaged into any one of the second spaces.

11. The computer system of claim 10 wherein all of the first spaces and the second spaces are equal in length.

12. The computer system of claim 7 wherein the predetermined pattern further comprises:
    a guiding zone; and
    a guiding track installed on the guiding zone; and the slide further comprises:
    a guiding protrude; and
    a guiding slot installed on the guiding protrude for engaging with the guiding track while the slide is mounting onto the pipeline so that the slide is capable of sliding back and forth along the pipeline.

13. The computer system of claim 12 wherein the predetermined pattern further comprises:
    a fixing track installed in parallel with the guiding track for engaging with the guiding slot of the guiding protrude of the slide while the positioning protrude is engaged into any one of the first spaces.

14. The computer system of claim 12 wherein the guiding protrude is made of materials of plasticity.

15. The computer system of claim 14 wherein the guiding protrude is made of plastic.

16. The computer system of claim 7 wherein the predetermined pattern further comprises:
    a guiding zone; and
    a guiding track installed on the guiding zone; and the slide further comprises:
    at least a guiding protrude; and a corresponding guiding slot installed on the guiding protrude for engaging with a fixing track while the positioning protrude is engaged into any one of the first spaces.

17. The computer system of claim 16 wherein the positioning protrude is made of materials of plasticity.

18. The computer system of claim 17 wherein the positioning protrude is made of plastic.

19. The computer system of claim 16 wherein the predetermined pattern further comprises:
a guiding track installed in parallel with the fixing track for guiding the slide to slide along the pipeline while the slide in mounted onto the pipeline and the positioning slot is engaged into guiding track.

20. The computer of claim 7 wherein the predetermined pattern further comprises a pipeline hook for hooking the slide and preventing the slide away from the pipeline after the slide is mounted onto the pipeline.

21. The computer system of claim 20 wherein the pipeline hook is made of materials of plasticity.

22. The computer system of claim 21 wherein the pipeline hook is made of plastic.

* * * * *